(12) United States Patent
Nakamura et al.

(10) Patent No.: US 8,814,426 B2
(45) Date of Patent: Aug. 26, 2014

(54) INFRARED SENSOR

(75) Inventors: Kenzo Nakamura, Naka (JP); Sei Kitaguchi, Saitama (JP); Mototaka Ishikawa, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 160 days.

(21) Appl. No.: 13/513,510

(22) PCT Filed: Dec. 14, 2010

(86) PCT No.: PCT/JP2010/072436
§ 371 (c)(1),
(2), (4) Date: Jun. 1, 2012

(87) PCT Pub. No.: WO2011/078004
PCT Pub. Date: Jun. 30, 2011

(65) Prior Publication Data
US 2012/0236902 A1    Sep. 20, 2012

(30) Foreign Application Priority Data
Dec. 25, 2009 (JP) ................................ 2009-295857

(51) Int. Cl.
*G01J 5/02* (2006.01)
*G01J 5/20* (2006.01)
*G01K 7/22* (2006.01)

(52) U.S. Cl.
USPC ......................... 374/121; 374/185; 250/338.1

(58) Field of Classification Search
USPC ...................................................... 250/338.1
See application file for complete search history.

(56) References Cited

U.S. PATENT DOCUMENTS 3,693,011 A * 9/1972 De Vaux et al. ........... 250/370.01
5,054,936 A * 10/1991 Fraden .......................... 374/164
5,397,897 A * 3/1995 Komatsu et al. ........... 250/338.4
5,583,058 A * 12/1996 Utsumi et al. .............. 250/338.4
5,962,854 A * 10/1999 Endo ............................. 250/349
6,034,369 A    3/2000 Oda (Continued)

FOREIGN PATENT DOCUMENTS

JP    H07-260579 A    10/1995
JP    08-097444        4/1996

(Continued)

OTHER PUBLICATIONS

International Search Report mailed Jan. 18, 2011 for the corresponding PCT Application No. PCT/JP2010/072436.

*Primary Examiner* — Gail Verbitsky
(74) *Attorney, Agent, or Firm* — Leason Ellis LLP.

(57) ABSTRACT

An infrared sensor comprises: an electrical insulating film sheet; first and second temperature sensor devices which are provided on one side of the electrical insulating film sheet, and are located at a distance from each other; a pair of contact electrodes, with which the first and second temperature sensor devices are attached respectively, formed on one side of the electrical insulating film sheet; an infrared absorbing film provided on the other side of the electrical insulating film sheet opposite the first temperature sensor device; and an infrared reflector film provided on the same side as the infrared absorbing film opposite the second temperature sensor device. The first and second temperature sensor devices respectively comprise: a thermistor element; and a pair of electrode layers, in which one of them is in contact with the contact electrode, formed both on the upper and lower surfaces of the thermistor element.

2 Claims, 4 Drawing Sheets

(56) References Cited

U.S. PATENT DOCUMENTS

| | | | |
|---|---|---|---|
| 6,222,111 B1 * | 4/2001 | Kern | 136/201 |
| 6,928,380 B2 * | 8/2005 | Chey et al. | 702/130 |
| 8,523,427 B2 * | 9/2013 | Pillans | 374/129 |
| 8,563,933 B2 * | 10/2013 | Noda | 250/338.4 |
| 2002/0101326 A1 | 8/2002 | Lavenuta | |
| 2002/0101327 A1 | 8/2002 | Lavenuta | |
| 2003/0091829 A1 * | 5/2003 | Handa et al. | 428/413 |
| 2003/0123517 A1 * | 7/2003 | Nojiri | 374/120 |
| 2003/0128098 A1 | 7/2003 | Lavenuta | |
| 2011/0180713 A1 * | 7/2011 | Noda | 250/338.4 |

FOREIGN PATENT DOCUMENTS

| | | |
|---|---|---|
| JP | H10-019670 A | 1/1998 |
| JP | 10-163539 | 6/1998 |
| JP | H10-318830 A | 12/1998 |
| JP | 2002-156284 A | 5/2002 |
| JP | 2002-305102 A | 10/2002 |
| JP | 2003-194630 A | 7/2003 |
| JP | 2010-281578 A | 12/2010 |

* cited by examiner

Fig. 6

INFRARED SENSOR

CROSS-REFERENCE TO RELATED PATENT APPLICATIONS

This application is a U.S. National Phase Application under U.S.C. §371 of International Patent Application No. PCT/JP2010/0072436, filed Dec. 14, 2010, and claims the benefit of Japanese Patent Application No. 2009-295857, filed Dec. 25, 2009, all of which are incorporated by reference herein. The International Application was published in Japanese on Jun. 30, 2011 as International Publication No. WO/2011/078004 under PCT Article 21(2)

FIELD OF THE INVENTION

This invention relates to an infrared sensor for measuring the temperature of an object to be measured by detecting infrared rays from the object.

BACKGROUND OF THE INVENTION

Infrared sensors allow contactless detection of infrared rays radiated and emitted from an object to be measured. Such sensors have been conventionally used as a temperature sensor.

For example, Patent Citation 1 discloses an infrared sensor comprising: a resin film placed in a support body; a temperature sensor device for detection of infrared rays, which is provided in the resin film and detects the infrared rays passing through an optical guide portion; and a temperature sensor device for temperature compensation, which is provided in the resin film, is shielded from the infrared rays, and detects the temperature of the support body.

In this infrared sensor, an infrared absorbing film is formed on the interior surface of the guide portion. Also, the resin film contains an infrared absorbing material such as carbon black to enhance its infrared absorption.

Additionally, a film type thermistor is employed as the infrared sensors for detection of infrared rays and for temperature compensation.

Further, Patent Citation 2 discloses an infrared sensor comprising: a temperature sensor device for detection of infrared rays, a temperature sensor device for temperature compensation, a resin film to fix these devices firmly, and a casing. The casing has a frame body wherein: the temperature sensor device for detection of infrared rays is placed at the infrared incident aperture side; and the temperature sensor device for temperature compensation is placed at the shield portion side which blocks infrared rays.

In this infrared sensor, the resin film contains an infrared absorbing material such as carbon black to enhance infrared absorption of the resin film; and the frame body is made from a material having good thermal conductivity to reduce the temperature gradient between the temperature sensor devices for detection of infrared rays and for temperature compensation.

Additionally, a radial leaded type thermistor with lead wires directly connected with the thermistor device is employed for both temperature sensor devices for detection of infrared rays and for temperature compensation.

PRIOR ART

Patent Documents

[Patent Citation 1]
Japanese Unexamined Patent Application Publication JP 2002-156284A (Paragraph [0026], FIG. 2)
[Patent Citation 2]
Japanese Unexamined Patent Application Publication JP H07-260579A (Claims, FIG. 2)

SUMMARY OF THE INVENTION

Technical Problem

The following technical problems still remain in the aforementioned conventional art. Both infrared sensors of Patent Citations 1 and 2 employ a structure in which the resin film containing an infrared absorbing material, such as carbon black, shields one side of the temperature sensor devices from the infrared rays to make one shielded temperature sensor device act as the temperature sensor device for temperature compensation. Since such a resin film has high thermal conductivity, there is a problem in which it will be difficult for a large temperature difference to arise between the temperature sensor devices for detection of infrared rays and for temperature compensation. Further, the distance between these temperature sensor devices is required to be sufficiently large to create a large temperature difference between them. However, this requirement makes the overall size of such an infrared sensor large; and thereby there is a problem in which minimization of the size thereof is difficult. Additionally, the casing is required to be provided with a structure in which the casing itself shields the temperature sensor device for temperature compensation from the infrared rays. Such a structure raises the cost of the casing.

Further, since the infrared sensor of Patent Citation 2 employs a frame body having good thermal conductivity, it allows heat of the infrared absorbing film to radiate, and then this radiation makes the sensitivity of the infrared sensor low. This is a problem, too. Also, since a radial leaded type thermistor with lead wires directly connected with the thermistor device is used for the infrared sensor, the narrow space between the lead wires and the thermistor device can conduct heat undesirably. Further, in a case that a radial leaded type thermistor or a chip type thermistor is used as the thermistor device; such a thermistor device requires spot measurement. Furthermore, in a case in which a temperature gradient exists in and/or across the resin film; there is a problem in which a large measurement error arises thereby.

The inventors have properly recognized the aforementioned problems, and the aim of the present invention is to provide an infrared sensor wherein: a large temperature difference can arise between the two temperature sensor devices for detection of infrared rays and for temperature compensation; minimization of the size thereof is easily possible; and the cost of the structure thereof is low.

Technical Solution

The present invention is an infrared sensor employing the structure below to resolve the aforementioned problems. That is, the infrared sensor of the present invention is an infrared sensor comprising: an electrical insulating film sheet; first and second temperature sensor devices which are provided on one side of the electrical insulating film sheet, and are located at a distance from each other; contact electrodes as a pair, with which the first and second temperature sensor devices are in contact respectively, formed on the one side of the electrical insulating film sheet; an infrared absorbing film which is provided on the other side of the electrical insulating film sheet, and is positioned opposite the first temperature sensor device across the electrical insulating film sheet; and an infrared reflector film which is provided on the other side of the electrical insulating film sheet, and is positioned opposite the second temperature sensor device across the electrical insulating film sheet; wherein the first and second temperature sensor devices comprise: a thermistor element having a plate shape and electrode layers as a pair, in which one of them is in contact with the contact electrode, formed both on the upper and lower surfaces of the thermistor element.

This infrared sensor provides: the infrared absorbing film which is on the other side of the electrical insulating film sheet, and is positioned opposite the first temperature sensor device across the electrical insulating film sheet; and the infrared reflector film which is on the other side of the electrical insulating film sheet, and is positioned opposite the second temperature sensor device across the electrical insulating film sheet.

That is, the infrared absorbing film absorbs the infrared rays incident on one portion of the electrical insulating film sheet; and the infrared reflector film reflects the infrared rays incident on the other portion of the electrical insulating film sheet. Therefore, on the electrical insulating film sheet which is thin and has low thermal conductivity, a large temperature difference can be made between the first temperature sensor device and the second temperature sensor device.

In other words, even if the electrical insulating film sheet is a low thermal conductivity film which does not contain the infrared absorbing material and/or the like, the infrared absorbing film enables the heat caused by the absorption of infrared rays to be conducted only to the portion of the electrical insulating film sheet just above the first temperature sensor device. Especially, since the heat of the infrared absorbing film is conducted through the electrical insulating film sheet, which is very thin; the detection sensitivity does not decrease, and the quick thermal response can be maintained.

Further, the area of the infrared absorbing film is adjustable arbitrarily; thus, by varying this area, an aperture angle for detection of the infrared rays can be varied to one suitable for a distance to an object to be measured, and then a high light-receiving efficiency can be secured.

Additionally, the infrared reflector film, which is provided on the electrical insulating film sheet and is located just above the second temperature sensor device, can block absorption of the infrared rays incident thereon by reflection.

Furthermore, the infrared absorbing film and the infrared reflector film are formed on the electrical insulating film sheet. That is, apart from air, the only medium which controls the conducting of heat between the infrared absorbing film and the infrared reflector film is the electrical insulating film sheet therebetween; and its cross-section through which heat can be conducted therebetween, is small. Thus, heat conduction between each temperature sensor device becomes difficult; the thermal interference therebetween them becomes smaller; thereby the detection sensitivity becomes higher.

As abovementioned, the infrared sensor has the structure wherein: the electrical insulating film sheet having low thermal conductivity reduces the mutual thermal influence between the first and second temperature sensor devices located thereon; one of the temperature sensor device measures the temperature of one portion in the electrical insulating film sheet just under the infrared absorbing film, and the other temperature sensor device measures a temperature of another portion in the electrical insulating film sheet just under the infrared reflection film.

Therefore, a large temperature difference can arise between the first temperature sensor device for detection of infrared rays and the second temperature sensor device for temperature compensation; and then greatly enhancing the sensitivity of the infrared sensor becomes feasible.

Additionally, since thermal coupling between the first temperature sensor device and the second temperature sensor device is weak, they can be placed close to each other; and then the overall size can be minimized. Further, the method for blocking the infrared rays is not a shielding structure using a frame body or a casing, but is an infrared reflector film. Such a method allows the cost of production to be decreased.

Further, even if the infrared absorbing film and/or the infrared reflector film are/is formed from a conductor material, the electrical insulating film sheet located between the first temperature sensor device and the second temperature sensor device can ensure sufficient isolation therebetween. Thus, materials having high infrared reflectance can be selected for the infrared reflector film without giving any consideration to their isolation.

Further, the first and second temperature sensor devices comprise: a thermistor element having a plate shape; and electrode layers as a pair, in which one of them is in contact with the contact electrode, formed both on the upper and lower surfaces of the thermistor element.

Thus, heat capacity of these sensor devices is small in the direction of the infrared rays (in the direction of thickness). Additionally, the heat is conducted successively through the contact electrodes having a large area, through the electrode layers, and into the thermistor element. Therefore, the small heat capacity and the above heat conduction enable the temperature sensor devices to have a quick response and improved detection sensitivity. In other words, the thermistor has a plate-shaped thermistor element, and provides electrode layers for making contact with the contact electrode having a large area. Such a thermistor is a so-called flake thermistor or wafer shape thermistor. Other types of thermistor, for example, a chip thermistor, have a thick chip-shaped thermistor element and provide electrodes at the ends thereof. Thus, compared with a chip thermistor, a flake type thermistor has higher thermal conductivity which can cause a quick thermal response and high detection sensitivity.

Further, in a case of a flake type thermistor, thermistor elements which have been selected from the same material plate are useable for both temperature sensor devices. Thus, the two sensor devices easily have almost the same electrical resistance and B constant.

Further, compared with a radial leaded type thermistor and/or a chip thermistor, the flake type thermistor can have wider detection area. Also, the detection area can be easily determined so to be a match the infrared absorbing film and the infrared reflector film. Therefore, measurement error caused by a temperature gradient decreases.

Furthermore, the infrared sensor of the present invention has a feature wherein: in plan view, the first and second temperature sensor devices have smaller external dimensions than that of the contact electrodes with which they are in contact.

That is, in this infrared sensor, the external dimensions of the first and second temperature sensor devices are determined so as to be smaller ones than that of the contact electrodes with which the first and second temperature sensor devices are to be in contact. Therefore, such small external dimension makes their heat capacities decrease, and causes them to have a quick heat response.

Furthermore, the infrared sensor of the present invention has a feature wherein: on the one side of the electrical insulating film sheet, contact side terminal electrodes as a pair, connected with the contact electrodes by contact side pattern wirings having a thin wire shape; wire bonding electrodes as a pair; and wire side terminal electrodes as a pair, connected with the wire bonding electrodes by wire side pattern wirings having a thin wire shape; are formed: and the electrode layers which are not in contact with the contact electrodes, are connected electrically with the wire bonding electrodes prepared for the electrode layers respectively, by thin metal wiring derived from wire bonding.

In other words, in this infrared sensor, the contact side pattern wiring having a thin wire shape, the wire side pattern wiring having a thin wire shape, and the thin metal wiring derived from wire bonding, are employed for connecting each electrode. Since these wirings are thin, they can hardly conduct the heat of the first and second temperature sensor devices, from them to the contact side terminal electrode, and further to the wire side terminal electrode. Thus, the heat loss is reduced, and thereby the detection sensitivity becomes higher. That is, undesirable thermal coupling caused by thermal conduction from the thermistor to the lead wires in the conventional art, can be prevented.

Advantageous Effects

The present invention brings about the following effects. That is, in the infrared sensor related to this invention, the infrared absorbing film is provided on the other side of the electrical insulating film sheet, and is positioned opposite the first temperature sensor device across the electrical insulating film sheet; and the infrared reflector film is provided on the other side of the electrical insulating film sheet, and is positioned opposite the second temperature sensor device across the electrical insulating film sheet.

Thus, a large temperature difference can arise between the first and second temperature sensor devices, and then the infrared sensor having high detection sensitivity becomes feasible; and the infrared sensor of small size can be produced at a low cost.

Further, the first and second temperature sensor devices comprise: a thermistor element having a plate shape; and electrode layers as a pair, in which one of them is in contact with a contact electrode, formed on both the upper and lower surfaces of the thermistor element.

Thus, a heat capacity of these sensor devices is small in the direction of the infrared rays (in the direction of thickness). Additionally, the heat is conduced successively through the contact electrodes having a large area, through the electrode layers, and into the thermistor element. Therefore, the small heat capacity and the above heat conduction enable the temperature sensor devices to have a quick heat response and improved detection sensitivity.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

EXPLANATION OF REFERENCE 1, 21 Infrared sensor
2, 32 Electrical insulating film sheet
3A, 23A First temperature sensor device
3B, 23B Second temperature sensor device
3a Thermistor element
3b Electrode layers
4 Contact electrodes
5 Infrared absorbing film
6 Infrared reflector film
7 Contact side terminal electrodes
7a Contact side pattern wirings
8 Wire bonding electrodes
9 Wire side terminal electrodes
9a Wire side pattern wirings
27 Chassis
27a First housing pocket
27b Second housing pocket
Y Thin metal wire

DETAILED DESCRIPTION OF THE INVENTION

Best Mode of Carrying Out the Invention

Figure 1:
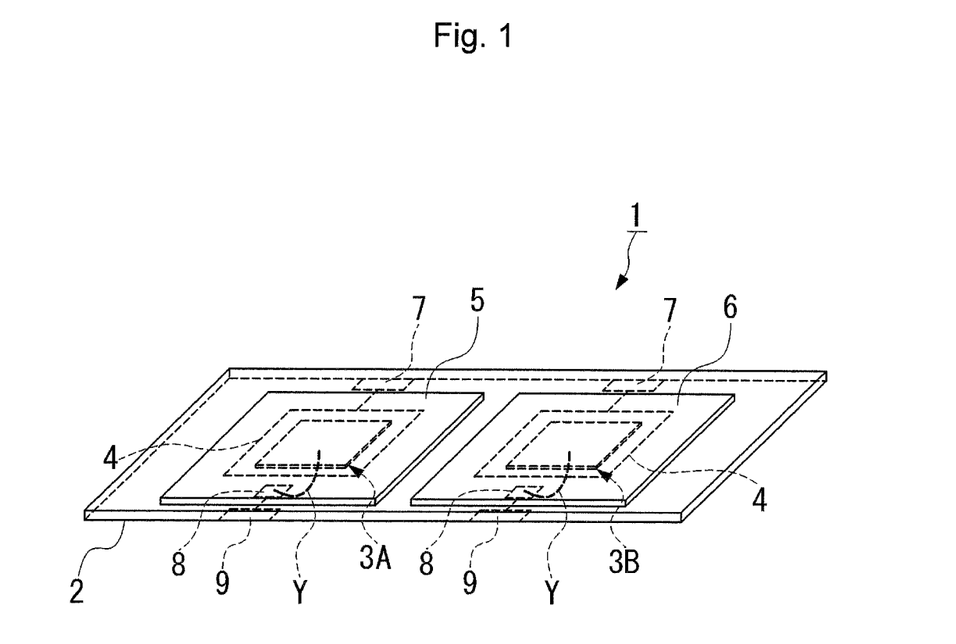
FIG. 1 is a perspective view showing a first embodiment of the infrared sensor regarding this invention.
Figure 4:
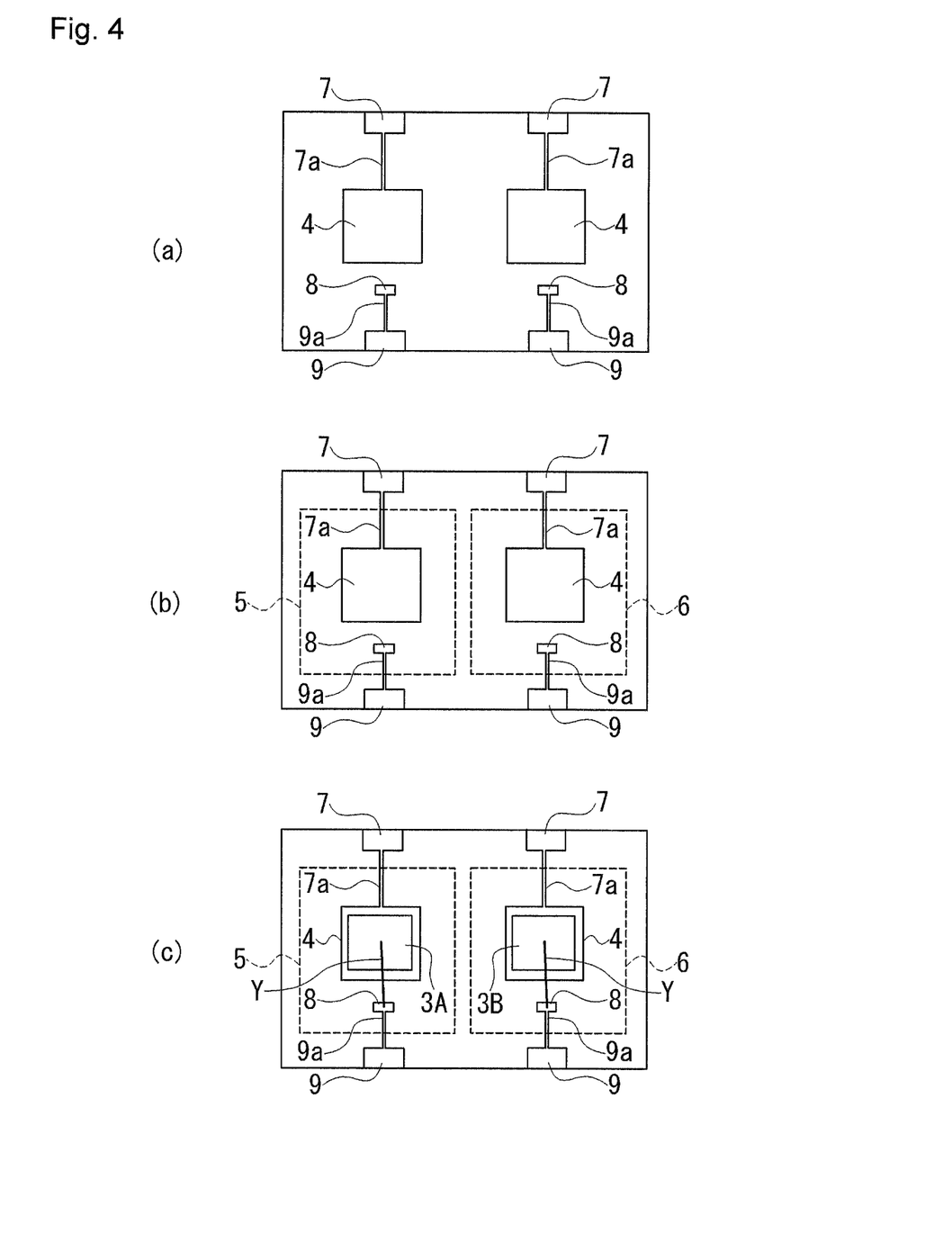
FIG. 4 are bottom views showing a method for making the infrared sensor in order of the manufacturing process, in the first embodiment.

Referring to FIGS. 1 and 4, a first embodiment of the infrared sensor relating to the present invention is detailed in the following descriptions. Further, components shown in the figures used for the following descriptions are individually scaled up or down to various sizes suitable for recognizably showing each of them, or for easily recognizing each of them.

Figure 2:
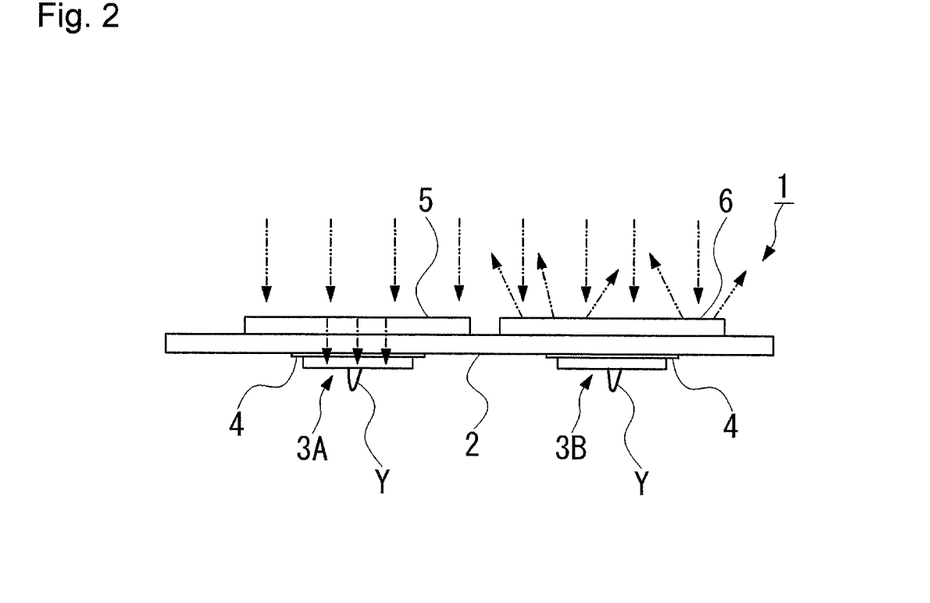
FIG. 2 is a front view showing the infrared sensor, in the first embodiment.

An infrared sensor 1 of this embodiment, as shown in FIGS. 1 and 2, comprises: an electrical insulating film sheet 2; a first temperature sensor device 3A and a second temperature sensor device 3B which are provided on one side (lower side) face of the electrical insulating film sheet 2, and are located at a distance from each other; contact electrodes 4 as a pair, with which the first temperature sensor device 3A and the second temperature sensor device 3B are in contact respectively, formed on the one side of the electrical insulating film sheet 2; an infrared absorbing film 5 which is provided on the other side (upper side) face of the electrical insulating film sheet 2, and is positioned opposite the first temperature sensor device 3A across the electrical insulating film sheet 2; and an infrared reflector film 6 which is provided on the other side of the electrical insulating film sheet 2, and is positioned opposite the second temperature sensor device 3B across the electrical insulating film sheet 2.

In other words, the infrared absorbing film 5 is located just above the first temperature sensor device 3A, and also the infrared reflector film 6 is located just above the second temperature sensor device 3B.

The electrical insulating film sheet 2 is formed from film transparent to the infrared rays. In this embodiment, the electrical insulating film sheet 2 is formed from a sheet made of polyimide resin.

Figure 3:
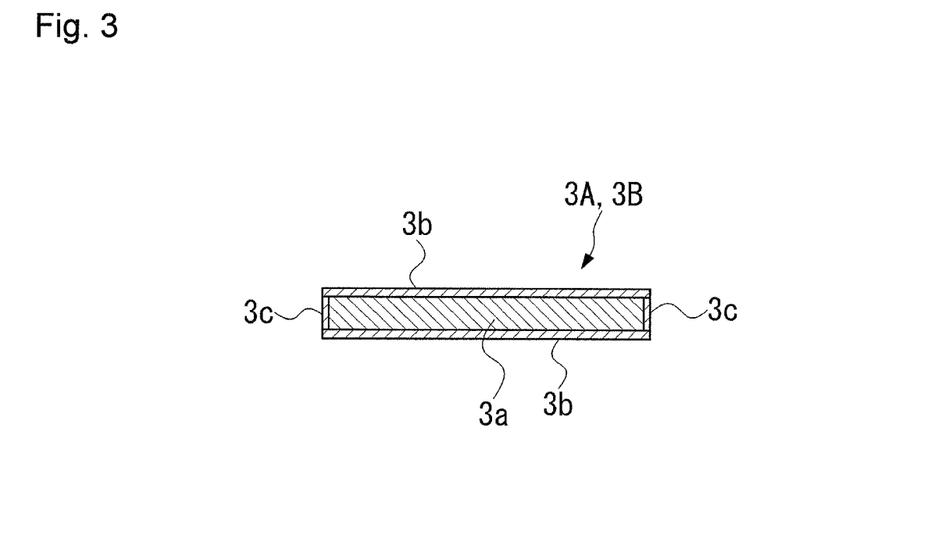
FIG. 3 is a cross-section showing the first and the second temperature sensor devices, in the first embodiment.

The first temperature sensor device 3A and the second temperature sensor device 3B, as shown in FIG. 3, comprise: a thermistor element 3a having a plate shape, and electrode layers 3b as a pair, in which one of them is in contact with the contact electrode 4, formed on both the upper and lower surfaces of the thermistor element 3a. This thermistor is a so-called flake thermistor.

Further, as the flake thermistor, there are three thermistor types, NTC type, PCT type, and CTR type.

In this embodiment, for example, an NTC type thermistor is employed as the first temperature sensor device 3A and as the second temperature sensor device 3B. The thermistor element 3a of this thermistor is made from thermistor material group(s) of Mn—Co—Cu, Mn—Co—Fe and/or the like.

The process of producing the above flake thermistor for the first temperature sensor device 3A and for the second temperature sensor device 3B, is as below.

Firstly, a plate element having a square plate shape formed from a ceramic made of such as the aforementioned thermistor material group(s), is prepared. Further, on both its upper and lower surfaces, glass paste is applied using serigraphy or the like; and then by baking it, glass layers 3c are formed thereon.

Next, by dicing this plate element into an oblong shape, this plate element is changed into square pillar elements. These square pillar elements are arrayed in a state such that their sides coated with the glass layer 3c abut on each other; and then the glass layer 3c is also formed on the uncoated sides of them using the same aforementioned method. Thus, square pillar elements, of which all sides thereof are coated with the glass layer 3c, are made.

Next, also by dicing the above square pillar element in a direction perpendicular to its center axis, the square pillar element is changed into the thermistor elements 3a having a plate shape.

Further, a jig (a fixture tool) for fixing these thermistor elements 3a is prepared. The jig has concavities on its upper surface into which the thermistor elements 3a can be properly fitted; and then the thermistor elements 3a are put into the concavities. In this state, conductive paste, for example Au paste or Ag paste, is applied onto the concavities using serigraphy or the like; and then by baking, the electrode layer 3b is formed on the upper face of each thermistor element 3a. Furthermore, electrode layer 3b is formed on the lower face of each thermistor elements 3a using the same method as mentioned above. By this process, the first temperature sensor device 3A and the second temperature sensor device 3B, as the flake thermistor, are produced.

Further, as shown in FIG. 4(a), contact side terminal electrodes 7 as a pair, connected with the contact electrodes 4 by contact side pattern wirings 7a having a thin wire shape; wire bonding electrodes 8 as a pair; and wire side terminal electrodes 9 as a pair, connected with the wire bonding electrodes 8 by wire side pattern wirings 9a having a thin wire shape, are formed on the one side (lower side) of the electrical insulating film sheet 2.

Furthermore, the electrode layers 3b which are not in contact with the contact electrodes 4, are connected electrically with the wire bonding electrodes 8 prepared for the electrode layers 3b respectively, by thin metal wiring Y derived from wire bonding.

Additionally, in plan view, the first temperature sensor device 3A and the second temperature sensor device 3B have smaller external dimensions than that of the contact electrodes 4 with which they are in contact. In other words, both of upper and lower faces of the thermistor element 3a are determined so as to have area smaller than that of the contact electrodes 4 with which they are in contact.

The infrared absorbing film 5 is formed from a material able to absorb infrared rays more efficiently than the electrical insulating film sheet 2 can absorb. For example, film containing infrared absorbing material such as carbon black, or infrared absorbing glass film (borosilicate glass film including 71% silicon dioxide) is employable as the above material. Thus, the infrared absorbing film 5 absorbs infrared rays radiated and emitted from an object to be measured. Further, heat generated in the infrared absorbing film 5 which absorbs the infrared rays, is conducted through the electrical insulating film sheet 2, to the first temperature sensor device 3A located just below; and then this heat conduction varies the temperature of the first temperature sensor device 3A. In order to completely cover the first temperature sensor device 3A and the contact electrode 4 with the infrared absorbing film 5, the infrared absorbing film 5 requires a larger size than that occupied by the first temperature sensor device 3A and the contact electrode 4.

The infrared reflector film 6 is formed from a material, for example mirror finished evaporated aluminum film or aluminum foil, which has a higher infrared reflectance than that of the electrical insulating film sheet 2. In order to completely cover the second temperature sensor device 3B and the contact electrode 4 with the infrared reflector film 6, the infrared reflector film 6 requires a larger size than that occupied by the second temperature sensor device 3B and the contact electrode 4.

The process for producing the infrared sensor 1 of this embodiment is as below.

Firstly, as shown in FIG. 4(a), on the one side (lower side) face of the electrical insulating film sheet 2, the contact electrodes 4, the contact side pattern wirings 7a, the contact side terminal electrodes 7, the wire bonding electrodes 8, and the wire side terminal electrodes 9 are formed respectively as foil conductor patterns.

Next, as shown in FIG. 4(b), on the other side (upper side) face of the electrical insulating film sheet 2, the infrared absorbing film 5 and the infrared reflector film 6, as foil conductor patterns, are formed at the backs of each contact electrode 4 respectively.

Next, as shown in FIG. 4(c), the first temperature sensor device 3A and the second temperature sensor device 3B are bonded onto each contact electrode 4 respectively, with solder or a bonding agent having electrical conductivity.

Further, one of the electrode layers 3b of the first temperature sensor device 3A which is not in contact with the contact electrode 4, is connected electrically with the wire bonding electrode 8 by thin metal wiring Y derived from wire bonding. Also, one of the electrode layers 3b of the first temperature sensor device 3B which is not in contact with the contact electrode 4, is connected electrically with the wire bonding electrode 8 by thin metal wiring Y derived from wire bonding. Therefore, the infrared sensor 1 is produced by the aforementioned process.

From the aforementioned description, the infrared sensor 1 of this embodiment comprises: the infrared absorbing film 5 which is provided on the other side of the electrical insulating film sheet 2, and is positioned opposite the first temperature sensor device 3A across the electrical insulating film sheet 2; and the infrared reflector film 6 which is provided on the other side of the electrical insulating film sheet 2, and is positioned opposite the second temperature sensor device 3B across the electrical insulating film sheet 2.

That is, the infrared absorbing film 5 absorbs the infrared rays incident on one portion; and the infrared reflector film 6 reflects the infrared rays incident on the other portion. Therefore, on the electrical insulating film sheet 2 which is thin and has low thermal conductivity, a large temperature difference arises between the first temperature sensor device 3A and the second temperature sensor devices 3B.

In other words, even if the electrical insulating film sheet 2 is a low thermal conductivity film which does not contain the infrared absorbing material and/or the like; as shown in FIG. 2, the infrared absorbing film 5 enables the heat caused by the absorption of infrared rays to be conducted only to the portion of the electrical insulating film sheet 2 just above the first temperature sensor device 3A. Especially, since the heat of the infrared absorbing film 5 is conducted through the electrical insulating film sheet 2, which is very thin, the detection sensitivity does not decrease, and the quick thermal response can be maintained. Further, the area of the infrared absorbing film 5 is adjustable arbitrarily; thus, by varying this area, an aperture angle for detection of the infrared rays can be varied to one suitable for a distance to an object to be measured; thereby a high light-receiving efficiency can be secured.

Additionally, the infrared reflector film 6, which is provided on the electrical insulating film sheet 2 and is located just above the second temperature sensor device 3B, can block absorption of the infrared rays incident thereon by reflection.

The infrared absorbing film 5 and the infrared reflector film 6 are provided on the electrical insulating film sheet 2. That is, apart from air, the only medium which controls the conducting of heat between the infrared absorbing film 5 and the infrared reflector film 6 is the electrical insulating film sheet 2 therebetween; and its cross-section through which heat can be conducted therebetween, is small. Thus, heat conduction between each temperature sensor device becomes difficult; the thermal interference therebetween becomes smaller; thereby the detection sensitivity becomes higher.

As mentioned above, the infrared sensor 1 of this embodiment has the structure wherein: the electrical insulating film sheet 2 having low thermal conductivity reduces the mutual thermal influence between both of the first temperature sensor device 3A and the second temperature sensor device 3B, located thereon; the first temperature sensor device 3A measures the temperature of one portion, which is just under the infrared absorbing film 5, in the electrical insulating film sheet 2; and the second temperature sensor device 3B measures the temperature of another portion, which is just under the infrared reflection film 6, in the electrical insulating film sheet 2.

Therefore, a large temperature difference can arise between the first temperature sensor device 3A for detection of infrared rays and the second temperature sensor device 3B for temperature compensation, thereby greatly enhancing the detection sensitivity of the infrared sensor 1 becomes feasible.

Additionally, since thermal coupling between the first temperature sensor device 3A and the second temperature sensor device 3B is weak, they can be placed close to each other; and then overall size can be minimized. Further, the method for blocking the infrared rays is not a shielding structure using a frame body or a casing, but is the infrared reflector film 6. Such a method allows the cost of production to be decreased.

Further, even if the infrared absorbing film 5 and/or the infrared reflector film 6 are/is formed from a conductor material, the electrical insulating film sheet 2 located between the first temperature sensor device 3A and the second temperature sensor device 3B can ensure sufficient isolation therebetween. Thus, materials having high infrared reflectance can be selected for the infrared reflector film without giving any consideration to their isolation.

Additionally, the electrical insulating film sheet 2 is made from a film transparent to the infrared rays. Thus, infrared absorption in the electrical insulating film sheet 2 around the infrared absorbing film 5 and around the infrared reflector film 6 is considerably reduced; and thereby the thermal influence caused by heat conduction from therearound to the first temperature sensor device 3A and to the second temperature sensor device 3B, can be reduced.

Both of the first temperature sensor device 3A and the second temperature sensor device 3B comprise: the thermistor element 3a having a plate shape and the electrode layers 3b as a pair, in which one of them is in contact with the contact electrode 4, formed on both the upper and lower surfaces of the thermistor element.

Also, both temperature sensor devices have a small heat capacity in the direction of the infrared rays (in the direction of thickness). Further, the heat is conduced successively through the contact electrodes 4 having a large area, through the electrode layers 3b, and into the thermistor element 3a. Therefore, the thermal response and the detection sensitivity can be improved.

That is; the aforementioned thermistor has the thermistor element 3a with a plate shape, provides the electrode layers 3b for making contact with the contact electrode 4 having a large area, and is the so-called flake thermistor. Other types of thermistor, for example, a chip thermistor have a thick chip-shaped element and provide electrodes at the ends thereof. Thus, compared with a chip thermistor, the flake type thermistor has higher thermal conductivity which can cause a quick thermal response and high detection sensitivity. Further, in a case of a flake type thermistor, thermistor elements 3a which have been selected from the same material plate are useable for both temperature sensor devices. Thus, both of the first temperature sensor device 3A and the second temperature sensor device 3B can easily have almost the same electrical resistance and B constant.

The infrared sensor of this embodiment has a feature wherein: in plan view, the first temperature sensor device 3A and the second temperature device 3B have smaller external dimensions than that of the contact electrodes 4 with which they are in contact. Therefore, such small external dimension makes their heat capacities decrease, and causes them to have a quick heat response.

Additionally, in this infrared sensor, the contact side pattern wiring 7a having a thin wire shape, the wire side pattern wiring 9a having a thin wire shape, and the thin metal wiring Y derived from wire bonding, are employed for connecting each electrode. Since these wirings are thin, they can hardly conduct the heat of the first temperature sensor device 3A and of the second temperature sensor device 3B to the contact side terminal electrode 7, and to the wire side terminal electrode 9. Thus, the heat loss is reduced, and then the detection sensitivity becomes higher. That is, undesirable thermal coupling caused by thermal conduction from the thermistor to the lead wires in the conventional art, can be prevented.

Figure 5:
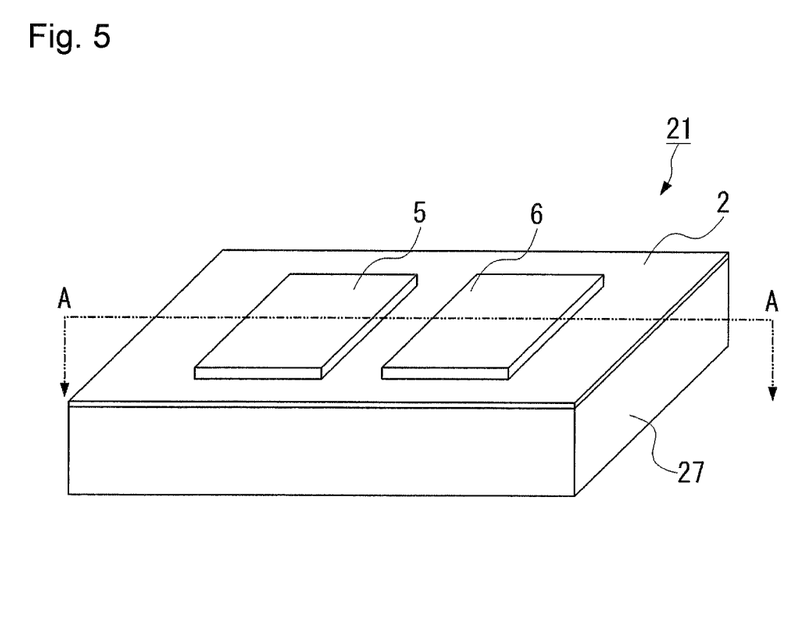
FIG. 5 is a perspective view showing a second embodiment of the infrared sensor regarding this invention.
Figure 6:
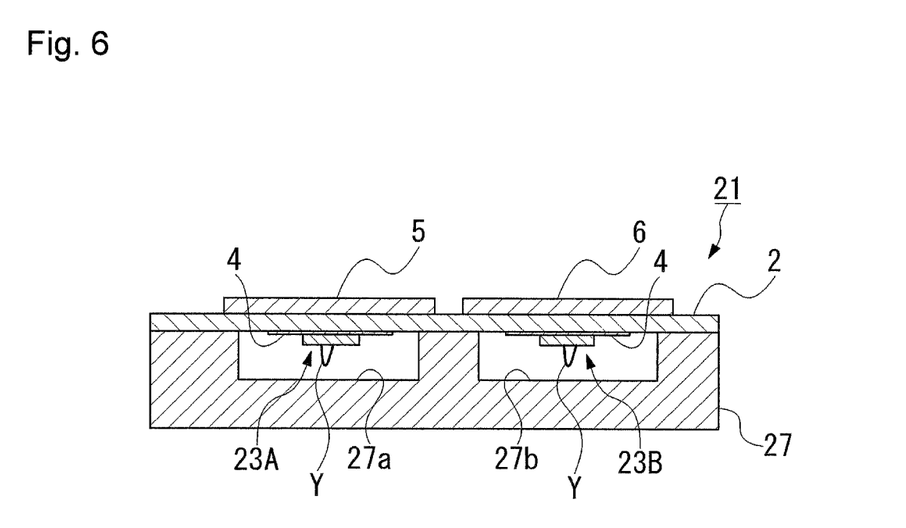
FIG. 6 is a cross-section of the plane shown by the arrow A-A line in FIG. 5.

Next, a second embodiment of the infrared sensor relating to the present invention, is detailed in the following descriptions by referring to FIGS. 5 and 6. Further, in the following descriptions, the same components as those of the first embodiment will be denoted by the same reference numerals, and a detailed description thereof will be omitted.

An infrared sensor 21 of the second embodiment has a structure wherein: a chassis 27 which is firmly fixed to one face of the electrical insulating film sheet 2 and firmly supports the electrical insulating film sheet 2, is provided; a first housing pocket 27a and a second housing pocket 27b which are covered with air and/or foamed plastics having lower thermal conductivity than that of the electrical insulating film sheet 2, are provided in the chassis 27; and a first temperature sensor device 23A and a second temperature sensor device 23B are stored in the first housing pocket 27a and the second housing pocket 27b individually. These are points of difference between the first and second embodiments.

Additionally, compared with the first embodiment, in the second embodiment, external dimensions of the first temperature sensor device 23A and of the second temperature sensor device 23B are determined so as to be even smaller in plan view than that of the contact electrodes 4 with which they are in contact.

The chassis 27 is made from, for example, resin. In order to prevent heat of the electrical insulating film sheet 2 from radiating undesirably, a material having a lower thermal conductivity than that of the electrical insulating film sheet 2, is suitable for the chassis 27.

Further, the first housing pocket 27a and the second housing pocket 27b are concavities with quadrilateral shape in cross-sectional view, and are formed at positions suitable for storing the first temperature sensor device 23A and the second temperature sensor device 23B therein, respectively. Also, the electrical insulating film sheet 2 closes and seals the opening of the concavities with the air therein.

As mentioned above, in the infrared sensor 21 of the second embodiment, the first housing pocket 27a stores the first temperature sensor device 23A; the second housing pocket 27b stores the second temperature sensor device 23B; and the first temperature sensor device 23A and the second temperature sensor device 23B are surrounded with air which has a lower thermal conductivity than that of the electrical insulating film sheet 2. Thus, heat conduction between the first temperature sensor device 23A and the second temperature sensor device 23B, can be considerably reduced.

Also, in plan view, the first temperature sensor device 23A and the second temperature device 23B have even smaller external dimensions than that of the contact electrodes 4 with which they are in contact. Therefore, a quicker heat response than that of the first embodiment, can be caused.

In addition, the invention is not limited to the above embodiments, but various modifications can be made without departing from the spirit and scope of the invention.

INDUSTRIAL APPLICABILITY

The present invention can provide an infrared sensor wherein: minimization of the size thereof is easily possible, and the cost of the structure thereof is low.

The invention claimed is:

1. An infrared sensor comprising:
an electrical insulating film sheet;
first and second temperature sensor devices which are provided on one side of the electrical insulating film sheet, said sensor devices being located at a distance from each other;
a pair of contact electrodes with which the first and second temperature sensor devices are in contact, respectively, said contact electrodes being formed on the one side of the electrical insulating film sheet;
an infrared absorbing film which is provided on the other side of the electrical insulating film sheet, and is positioned opposite the first temperature sensor device across the electrical insulating film sheet; and
an infrared reflector film which is provided on the other side of the electrical insulating film sheet, and is positioned opposite the second temperature sensor device across the electrical insulating film sheet;
wherein the first and second temperature sensor devices respectively comprise:
a thermistor element; and
a pair of electrode layers, one of which is in contact with the contact electrode, said electrode layers being formed both on upper and lower surfaces of the thermistor element; and
further wherein on the one side of the electrical insulating film sheet, there are:
a pair of contact side terminal electrodes that are connected with the contact electrodes by contact side pattern wirings in a form of a thin wire;
a pair of wire bonding electrodes; and
a pair of wire side terminal electrodes that are connected with the wire bonding electrodes by wire side pattern wirings in a form of a thin wire, and wherein,
each of the electrode layers which are not in contact with the contact electrodes is connected electrically with each of the wire bonding electrodes by thin metal wiring derived from wire bonding.

2. An infrared sensor comprising:
an electrical insulating film sheet;
first and second temperature sensor devices which are provided on one side of the electrical insulating film sheet, said sensor devices being located at a distance from each other;
a pair of contact electrodes, with which the first and second temperature sensor devices are in contact respectively, said contact electrodes being formed on the one side of the electrical insulating film sheet;
an infrared absorbing film which is provided on the other side of the electrical insulating film sheet, and is positioned opposite the first temperature sensor device across the electrical insulating film sheet; and
an infrared reflector film which is provided on the other side of the electrical insulating film sheet, and is positioned opposite the second temperature sensor device across the electrical insulating film sheet;
wherein the first and second temperature sensor devices respectively comprise:
a thermistor element; and
a pair of electrode layers, one of which is in contact with the contact electrode, said electrode layers being formed both on upper and lower surfaces of the thermistor element;
wherein external dimensions of the first and second temperature sensor devices in plan view are smaller than those of the contact electrodes that are attached with temperature sensor devices;
wherein on the one side of the electrical insulating film sheet there are:
a pair of contact side terminal electrodes that are connected with the contact electrodes by contact side pattern wirings in a form of a thin wire,
a pair of wire bonding electrodes and
a pair of wire side terminal electrodes that are connected with the wire bonding electrodes by wire side pattern wirings in a form of a thin wire; and
wherein each of the electrode layers which are not in contact with the contact electrodes is connected electrically with each of the wire bonding electrodes by thin metal wiring derived from wire bonding.

* * * * *